3,849,365
METHOD FOR PRODUCTION OF PLASTICIZED THERMOPLASTIC POWDER MIXTURES
Johann Bauer and Walter Popp, Burghausen, Germany, assignors to Wacker-Chemice GmbH, Munich, Germany
No Drawing. Filed July 31, 1973, Ser. No. 384,211
Claims priority, application Germany, Aug. 2, 1972, P 22 38 029.6
Int. Cl. C08f 45/26, 45/46, 45/50
U.S. Cl. 260—34.2               6 Claims

ABSTRACT OF THE DISCLOSURE

A method for the production of dry thermoplastic powder mixtures, capable of trickling, from suspension polymerized polyvinyl chloride and having a plasticizer content of 45% to 60% by weight based upon the finished powdered mixture.

THE PRIOR ART

The preparation of plasticized polyvinyl chloride was generally effected in the form of granular material, as agglomerate material, or as a dry mixture. The type of preparation was determined by the field of application of the semifinished product or of the finished part, by the machine technology used in the preparation, and by the formulation used, particularly the amounts of plasticizer. In most cases it was desirable to produce dry mixtures with a highly plasticized portion, because the preparation costs in this method were lower and the initial thermal stress of the polyvinyl chloride was lower, which manifested itself in a greater fastness to light and resistance to weather influences.

According to the methods of preparation known in the prior art and using conventional high-speed mixers, such as "fluid mixers," dry powder blends could be obtained from suspension polymerized polyvinyl chloride and plasticizer up to a content of 25% by weight of plasticizer. Up to 35% by weight of plasticizer had been used for agglomeration methods; and with even slightly higher plasticizer contents the polyvinyl chloride was processed to granules.

It is known from U.S. Pat. 3,090,763 to improve the trickling properties of plasticizer containing PVC powder blends by adding thereto finely powdered additives, such as certain organic salts, oxides or PVC resins. These substances were preferably added after the mixture has cooled to room temperature. Using these procedures, powder blends capable of trickling with a plasticizer content of up to 43% by weight were obtained.

But it is of great technical interest to produce plasticizer PVC powder mixtures with even higher plasticizer contents. According to the known prior art procedures this was not possible, however, because when larger amounts of plasticizer were added, an uneven agglomeration was formed even under favorable circumstances; while in most instances the PVC powder would become blocked.

OBJECTS OF THE INVENTION

It is an object of the present invention to provide a method for the production of dry powder mixtures, capable of trickling, from suspension polymerized polyvinyl chloride and large amounts of plasticizer of 45% to 60% by weight.

It is another object of the present invention to provide a process for the production of dry thermoplastic powder mixtures, capable of trickling, from suspension polymerized polyvinyl chloride having a plasticizer content of 45% to 60% by weight based upon the finished powdered mixture, comprising initially mixing a powdered suspension polymerized polyvinyl chloride with a first amount of from 40% to 66% by weight of plasticizer, but not more than 30% by weight plasticizer based upon the finished powdered mixture, with high speed agitation, until said plasticizer has been worked into said polyvinyl chloride to produce an initial mixture; subsequently mixing said initial mixture with a second amount of from 34% to 60% by weight of the plasticizer to produce a subsequent mixture under high speed agitation without application of external heat in such a manner that the temperature does not drop below 80° C. during the period of addition of said second amount of plasticizer; and recovering said dry thermoplastic powder mixture capable of trickling having a plasticizer content of 45% to 60%.

These and other objects of the invention will become apparent as the description thereof proceeds.

DESCRIPTION OF THE INVENTION

The present invention is directed to a process for the production of dry thermoplastic powder mixtures, capable of trickling, from suspension polymerized polyvinyl chloride having a plasticizer content of 45% to 60% by weight based upon the finished powdered mixture, comprising initially mixing a powdered suspension polymerized polyvinyl chloride with a first amount of from 40% to 66% by weight of plasticizer, but not more than 30% by weight plasticizer based upon the finished powdered mixture, with high speed agitation, until said plasticizer has been worked into said polyvinyl chloride to produce an initial mixture; subsequently mixing said initial mixture with a second amount of from 34% to 60% by weight of the plasticizer to produce a subsequent mixture under high speed agitation without application of external heat in such a manner that the temperature does not drop below 80° C. during the period of addition of said second amount of plasticizer; and recovering said dry thermoplastic powder mixture capable of trickling having a plasticizer content of 45% to 60%. The preferred temperature which does not drop below 80° C. during the period of addition of said second amount of plasticizer, is between 80° C. and 120° C.

A preferred embodiment according to the process of the present invention is that during the initial mixing the first amount of plasticizer and the polyvinyl chloride are first agitated at a speed of 600 to 800 r.p.m. while the plasticizer is being added; and this initial mixture is then agitated at the speed of 1200 to 2000 r.p.m. until a temperature of at least 80° C. is attained; and that during the subsequent mixing the second amount of plasticizer and the initial mixture are first agitated at a speed of 600 to 800 r.p.m. while the plasticizer is being added in such a manner that the temperature of the subsequent mixture does not drop below 80° C.; and the subsequent mixture is then agitated at a speed of 1200 to 2000 r.p.m. to again bring the temperature of the mixture above 110° C., before the finished mixture is finally cooled.

An especially preferred embodiment according to the process of the present invention is that the subsequent mixture, after being agitated at a speed of 1200 to 2000 r.p.m., is cooled to room temperature and during this cooling step, from 1% to 10% by weight of powdered additives selected from the group consisting of silica, quartz powder, powdered thermoplastics, stabilizers and the mixtures thereof are added to a mixture containing 55% to 60% by weight of plasticizer.

The capacity to trickle is the ability of the suspension polymerized polyvinyl chloride particles containing 45% to 60% plasticizer to flow freely under the influence of gravity at rates of about 5 cc. per second, without undergoing agglomeration or blockage.

The method according to the invention has the advantages of permitting for the first time the production of powder blends having a plasticizer content of 45% to 60% by weight which are dry and capable of trickling. This capability for trickling is a function of the screen analysis. On the one hand, the coarse fraction should not be too high; and on the other hand, the fine fraction (of dimension less than 63 microns) must be less than 15% to ensure an adequate capability for trickling. In crude PVC the fraction of fine particles is 0% to 5%.

A suitable crude-PVC for the method according to the invention is obtained according to the known suspension method, by the polymerization of vinyl chloride in the aqueous phase in the presence of oil-soluble radical-formers, protective colloids and other polymerization aids, if necessary. For the most part the PVC has a K-value between 60 and 80. Porous products are preferred, which are thus particularly suitable for the production of the dry blend containing from 45% to 60% by weight of plasticizer.

Suitable plasticizers that can be used include those which are generally employed in the production of plasticized PVC. Examples of such plasticizers are as follows: organic compounds, for example cyclic hydrocarbon dicarboxylic acid esters, such as phthalic acid and hexahydrophthalic acid diesters of alkanols having 1 to 12 carbon atoms, preferably having 1 to 8 carbon atoms, for example dimethyl phthalate, diethyl phthalate, dibutyl phthalate, di-2-ethylbutyl phthalate, di-n-hexyl phthalate, di-2-ethylhexyl phthalate, diisooctyl phthalate, di-2-ethylhexylhexahydro-phthalate; phthalic acid and hexahydrophthalic acid diesters of alkoxyalkanols having 2 to 10 carbon atoms, preferably having 3 to 6 carbon atoms, for example dimethoxyethyl phthalate and dibutoxyethyl phthalate; phthalic acid and hexahydrophthalic acid diesters of alkanols having 1 to 6 carbon atoms and cycloalkanols having 5 to 7 carbon atoms, for example butyl cyclohexyl phthalate; phthalic acid and hexahydrophthalic acid diesters of alkanols having 1 to 6 carbon atoms and phenylalkanols of 7 to 10 carbon atoms, for example butyl benzyl phthalate; and phthalic acid and hexahydrophthalic acid diesters of monoalkyl ethers of polyethylene glycols having from 5 to 12 carbon atoms, for example bis(diethylene glycol monoethyl ether) phthalate.

Further suitable examples of plasticizers include organic aliphatic compounds, for example alkanedioic acid esters of the above alcohols such as adipic acid diesters for example di-n-hexyl adipate, dibutyl adipate, di-2-ethylhexyl adipate, diisooctyl adipate, octyl decyl adipate, di-(2-ethoxyethyl) adipate, and sebacic acid diesters, for example di-n-butyl sebacate and di-2-ethylhexyl sebacate.

Other suitable examples of plasticizers include phosphoric acid esters of the above alcohols, such as tri-n-butyl phosphate, tri-butoxyethyl phosphate, tricresyl phosphate, cresyl-diphenyl phosphate, and 2-ethylhexyl-diphenyl phosphate.

Still further suitable examples of plasticizers include alkyl sulfonic acid esters of the above alcohols and epoxidized soybean oil.

Auxiliary aids mostly used, such as lubricants, fillers and stabilizers, can likewise be worked in. Usually they are introduced into the mixer together with the PVC. Examples of stabilizers include metallic salts of inorganic acids of metals such as lead, tin, barium and cadmium and inorganic acids such as sulfuric acid, with lead sulfate being preferred. Examples of lubricants are heavy metal alkanoates such as lead-stearate, soaps of water hardness causing metals such as calcium soaps and barium soaps, as well as lead complexes. In one embodiment, fillers are not used because the method is of particular importance for filler-free, plasticized PVC blends. In another embodiment fillers are used to produce filler-containing PVC powder blends; and the danger of blocking is negligible, because the filler can absorb a part of the plasticizer.

The following examples are merely illustrative of the present invention without being deemed limitative in any manner thereof.

EXAMPLES

The suspension polymerized polyvinyl chloride and the auxiliary aid substances were introduced into the high speed mixer. Then the high speed mixer was set at a low speed of 600 to 800 r.p.m.; and the first part of the plasticizer was metered in during a period of 2 to 5 minutes. Then the mixer was switched to a high speed of 1200 to 2000 r.p.m.; and the mixing was conducted for the time required until the mixture had attained the temperature of at least 80° C., and preferably a temperature between 95° C. to 125° C. This usually required from 5 to 10 minutes so that this initial mixing phase lasted from about 7 to 15 minutes.

Subsequently the mixer was again switched to the above low speed range of 600 to 800 r.p.m. and the second part of the plasticizer was metered in during a period of 2 to 5 minutes in such a manner that the temperature did not drop below 80° C. After all the plasticizer had been added then the mixer was again switched to the above high speed range of 1200 to 2000 r.p.m. and was operated for 5 to 7 minutes. The temperature in this second mixing phase finishing step was about 110° C. to 140° C. The total mixing time of this subsequent mixing phase was 7 to 12 minutes. Then the mixed material was cooled in known manner, for example, by introducing it into a cooling mixer.

In the production of dry powder blends capable of trickling with 55% to 60% by weight plasticizer, it might be of advantage to add about 1% to 10% by weight of powdered additives to the powder blend during the cooling phase. This way a product having a finer particle size was obtained, which was desirable for certain uses. Examples of powdered substances are: silica, quartz powder, powdered thermoplasts, like emulsion PVC or PVC past, or the mixtures thereof.

The powder blends with a high plasticizer content are of particular importance for the production of plasticized sections with rubber-elastic properties and a high resiliency, for example, for use as packing materials and laboratory hoses.

Example 1

Into a 75 liter high speed mixer, a Henschel "fluid mixer," were introduced 100 parts of a suspension polymerized PVC with a K-value of 70 (Vinnol H 70 D, trademark of Wacker Chemie GmbH), 3 parts of tribasic lead sulfate and 1 part 51% by weight lead stearate, wherein the percent relates to the percent by weight of lead. After setting the mixer to a low speed of 750 r.p.m., 50 parts of diisooctyl phthalate were metered in a uniform flow during a period of 2 minutes. Then the mixer was switched to a high speed of 1500 r.p.m. and after 8 minutes of mixing at this speed a temperature of 120° C. was attained. Subsequently the mixer was switched again to a low speed of 750 r.p.m.; and an additional 50 parts of diisooctyl phthalate were metered in during a period of 2 minutes of mixing at this low speed. The temperature dropped to 96° C. Then the mixer was switched back to a high speed of 1500 r.p.m.; and during the next 5 minutes of mixing at this speed a temperature of 123° C. was attained. The hot mixture was then poured into a cooling mixer and cooled to 40° C.

A dry powder blend capable of trickling was obtained with the following screen analysis reported below in Table 1.

TABLE 1

| Passage size in microns | 500 | 315 | 200 | 100 | 63 | <63 |
|---|---|---|---|---|---|---|
| Percent of particles passing through | 2.0 | 2.4 | 27.2 | 65.2 | 3.2 | 0 |

Example 2

A powder blend was produced according to the procedure of Example 1, but 5 parts of a PVC paste with K-value 70 (Vinnol P 70, trademark of Wacker) was added to the cooling mixer during the cooling phase. A dry powder blend capable of trickling was obtained with the following screen analysis reported below in Table 2.

TABLE 2

| Passage size in microns | 500 | 315 | 200 | 100 | 63 | <63 |
|---|---|---|---|---|---|---|
| Percent of particles passing through | 0.8 | 2.4 | 21.2 | 70.0 | 5.2 | 0.4 |

Example 3

Into a high speed mixer according to Example 1 were charged 95 parts of a suspension polymerized PVC with a K-value of 70 (Vinnol H 70 E, trademark of Wacker Chemie GmbH), 3 parts tribasic lead-sulfate, and 1 part 51% lead stearate. While stirring at 750 r.p.m. 60 parts of alkyl sulfonic acid cresyl ester were metered in during a period of 4 minutes. Then the mixer was run for 10 minutes at a high speed of 1500 r.p.m. and a temperature of about 100° C. was attained. The mixer was then switched to a low speed of 750 r.p.m. and 80 parts of alkyl sulfonic acid cresyl ester were metered in during the period of 5 minutes, with the temperature dropping to 81° C. During the subsequent mixing for 7 minutes, a temperature of 130° C. was attained at a high speed of 1500 r.p.m. The hot powdered mixture was poured into a cooling mixer, and then 5 parts of a PVC paste with a K-value of 70 (Vinnol P 70 E, trademark of Wacker Chemie GmbH) were added. The resulting dry blend capable of trickling had the following screen analysis reported below in Table 3.

TABLE 3

| Passage size in microns | 500 | 315 | 200 | 100 | 63 | <6 |
|---|---|---|---|---|---|---|
| Percent of particles passing through | 4.4 | 11.6 | 33.2 | 49.6 | 0.9 | 0. |

Example 4

In a test according to the procedure of Example 3, but wherein the entire plasticizer comprising 140 parts of plasticizer was added at the start of the mixing the PVC powder blocked at about 50° C.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the production of dry thermoplastic powder mixtures, capable of trickling, from suspension polymerized polyvinyl chloride having a plasticizer content of 45% to 60% by weight based upon the finished powdered mixture, comprising initially mixing a powdered suspension polymerized polyvinyl chloride with a first amount of from 40% to 66% by weight of plasticizer, but not more than 30% by weight plasticizer based upon the finished powdered mixture, with high speed agitation, until said plasticizer has been worked into said polyvinyl chloride to produce an initial mixture and a temperature of at least 80° C. is attained; subsequently mixing said initial mixture with a second amount of from 34% to 60% by weight of the plasticizer to produce a subsequent mixture under high speed agitation without application of external heat in such a manner that the temperature does not drop below 80° C. during the period of addition of said second amount of plasticizer; and recovering said dry thermoplastic powder mixture capable of trickling having a plasticizer content of 45% to 60% by weight based upon the finished powdered mixture.

2. The process of claim 1, in which said temperature of said subsequent mixture ranges between 80° C. to 120° C.

3. The process of claim 1, in which during said initial mixing said first amount of plasticizer and said polyvinyl chloride are first agitated at a speed of 600 to 800 r.p.m. while said plasticizer is being added; and this initial mixture is then agitated at the speed of 1200 to 2000 r.p.m. until a temperature of at least 80° C. is attained.

4. The process of claim 1, in which during said subsequent mixing said second amount of plasticizer and said initial mixture are first agitated at a speed of 600 to 800 r.p.m. while said plasticizer is being added, and said subsequent mixture is then agitated at a speed of 1200 to 2000 r.p.m.

5. The process of claim 4, in which said subsequent mixture, after being agitated at a speed of 1200 to 2000 r.p.m., is cooled to room temperature.

6. The process of claim 5, in which during said cooling step, from 1% to 10% by weight of powdered additives selected from the group consisting of silica, quartz powder, powdered thermoplastics, stabilizers and the mixtures thereof are added to a mixture containing 55% to 60% by weight plasticizer.

References Cited
UNITED STATES PATENTS 2,530,852    11/1950    Bixby _____ 260—34.2
3,090,763    5/1963    Hillier _____ 260—23 X A MORRIS LIEBMAN, Primary Examiner S. L. FOX, Assistant Examiner U.S. Cl. X.R.

260—31.2 R, 30.8 R, 30.6 R